Sept. 20, 1966   F. J. SLOAN   3,274,047
LOCALLY DEFORMED AND LOCALLY DELAMINATED SCORES
AND THE METHOD AND APPARATUS FOR MAKING SAME
Filed April 1, 1963   4 Sheets-Sheet 1

INVENTOR.
FRANCIS J. SLOAN
BY
*Walter C. Kehm*
ATTORNEY

Sept. 20, 1966 F. J. SLOAN 3,274,047
LOCALLY DEFORMED AND LOCALLY DELAMINATED SCORES
AND THE METHOD AND APPARATUS FOR MAKING SAME
Filed April 1, 1963 4 Sheets-Sheet 2
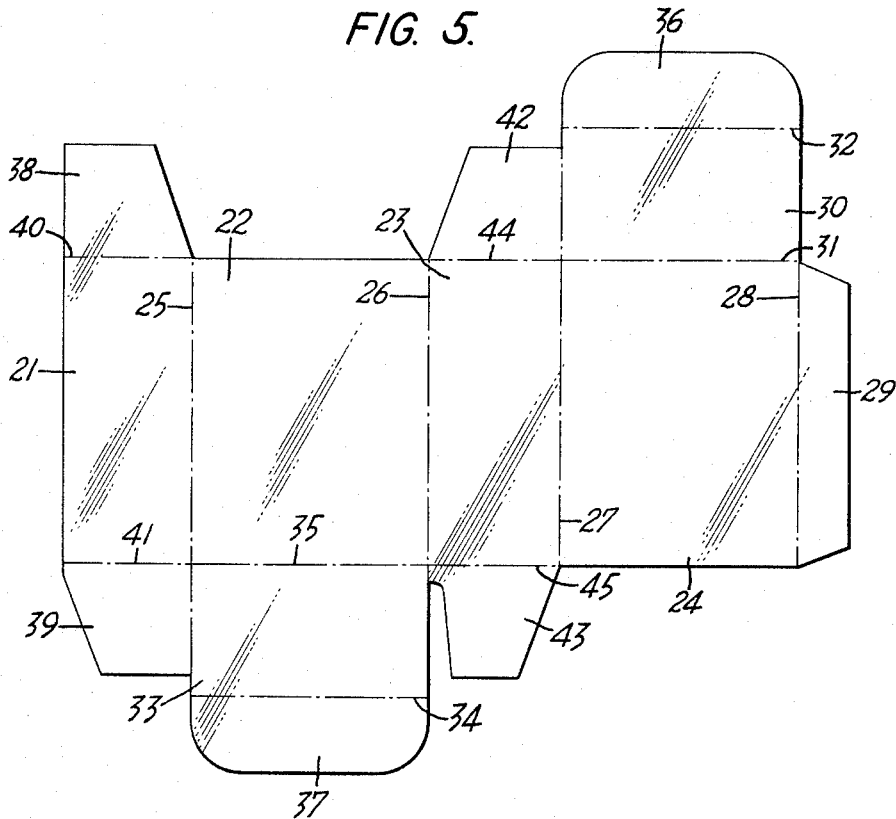
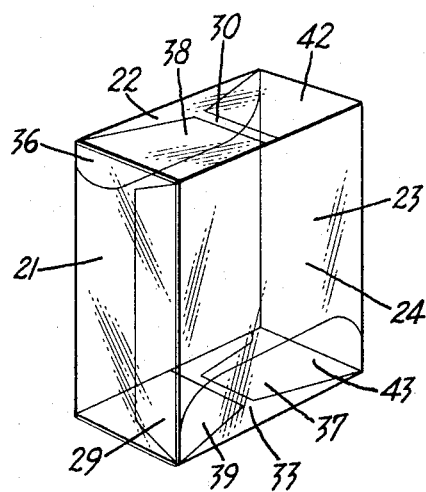
INVENTOR.
FRANCIS J. SLOAN
BY
ATTORNEY Sept. 20, 1966　　　　　　F. J. SLOAN　　　　　　3,274,047
　　　LOCALLY DEFORMED AND LOCALLY DELAMINATED SCORES
　　　　AND THE METHOD AND APPARATUS FOR MAKING SAME
Filed April 1, 1963　　　　　　　　　　　　4 Sheets-Sheet 3

INVENTOR.
FRANCIS J. SLOAN
BY
ATTORNEY

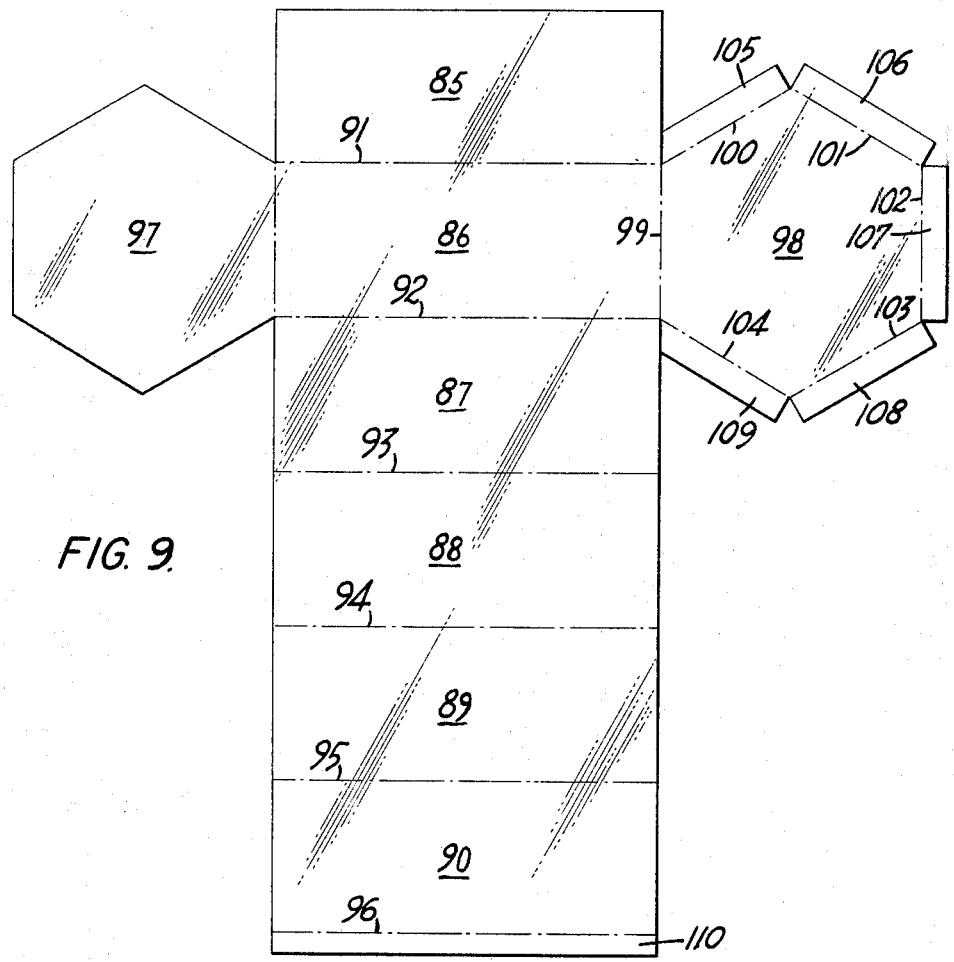
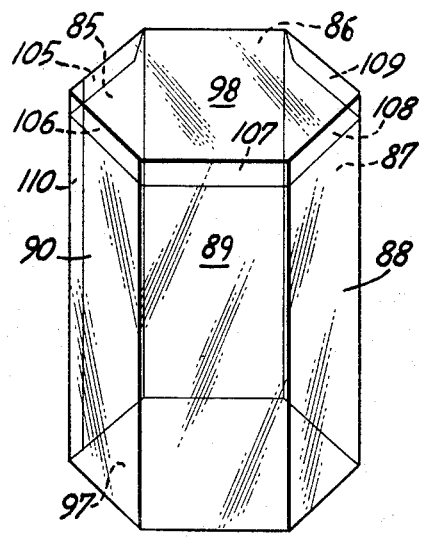

United States Patent Office 3,274,047
Patented Sept. 20, 1966

3,274,047
LOCALLY DEFORMED AND LOCALLY DELAMINATED SCORES AND THE METHOD AND APPARATUS FOR MAKING SAME
Francis J. Sloan, Cranford, N.J., assignor to Union Carbide Corporation, a corporation of New York
Filed Apr. 1, 1963, Ser. No. 269,652
16 Claims. (Cl. 161—46)

This invention relates in general to plastic containers and more particularly to a method for effecting a hingeable fold in a synthetic plastic sheet and products thereof.

Heretofore folding cartons from precut and precreased blanks have been common in the paper industry. In the last twenty-five years many attempts have been made to adapt plastic sheet materials, particularly the low cost transparent plastic sheets, to the cartoning industry. Notwithstanding this demand, the art has failed to develop a low cost plastic substitute. The principal difficulty confronting the art in regard to substituting a plastic sheet for a paper carton has been the art's inability to devise a hingeable fold in a rigid plastic sheet.

Heretofore, methods have been employed whereby the fold in the plastic sheet is effected by making a rigid angular junction rather than an employment of a hingeable fold. Pragmatically, plastic cartons having rigid angular junctions are not analogous or substitutable for the paper cartons. In contrast to the paper cartons, these cartons are too bulky and rigid in addition to being considerably weakened such that the plastic sheet readily tears and fractures along the fold when subjected to a nominal stress.

Various other methods have been attempted to circumvent the plastic sheet hinge problem. Typical of the other methods include laminating the rigid plastic sheet with a pliable sheet, incorporation of chemicals into the single ply plastic sheet and cutting the plastic sheet along the fold; however these means have been unsuccessful since the resulting carton lacks basic prerequisites such as strength, appearance, oriented flexibility, and commercial practicality.

Styrene polymer sheets appear to have physical properties most analogous to paperboard. Unfortunately heretofore the art has been unable to circumvent the problem of scoring said polymers without weakening the polymer sheet to such an extent that the scored area becomes so brittle that it has no utility.

An object of this invention is to provide for a hingeable fold which is analogous in characteristics to the fold in a paper carton.

Another object of the invention is to provide for a fold in a plastic sheet which is resistant to cracking or fracturing when said fold is flexed.

Still another object of the invention is to provide for a fold in a plastic sheet which possesses an ability to retain its resiliency when the adjacent planes traverse about the longitudinal axis of said fold.

A further object of the invention is to provide for a fold in a plastic sheet capable of resisting tearing or shearing along said fold when tension is applied to the adjacent appendant planes.

Another object of the invention is to provide for a fold in a plastic sheet which is resistant to shattering or fracturing upon impact.

Still another object of the invention is to provide for a score in a plastic sheet which possesses an inherent ability to be folded along a predetermined line, i.e., the score.

A further object of the invention is to provide for a fold which does not destroy the transparent character of the adjacent appendant plastic sheet about said fold.

Another object of the invention is to provide for a fold in a plastic sheet that is subject to mass production.

In the method of the present invention, a hingeable fold is effected between two integral panel members in an oriented styrene polymer sheet by local deformation and local delamination along a score for a fold.

The method of the present invention comprises resiliently supporting a bioriented styrene polymer sheet and contacting said sheet with a bevel scoring member under a pressure and temperature sufficient to locally deform and locally delaminate the polymer sheet along the line of contact with said scoring member, said bevel scoring member having a bevel section which includes a projected apex angle from 45 degrees to 80 degrees and a rounded impact edge tangentially sectionally disposed in respect to the surfaces defining said bevel section, said rounded impact edge being defined by an average radius from 25 percent to 110 percent of the thickness of the sheet being scored, the surfaces defining the bevel section being oriented to form respective angles each of from 45 degrees to 70 degrees with respect to the plane in which the resiliently supported sheet reposes.

As an additional aspect of the present invention there is provided a pre-scored oriented styrene polymer sheet blank for a container having at least two integral panel members with a score for a fold between said integral panel members, the score being characterized by a localized deformation and localized delamination of the plastic blank along the line of the score such that the score consists of a plurality of deformed and delaminated layers of plastic wherein a single delaminated layer has a thickness less than that of said plastic sheet and the outer limits of delamination are localized within the confines of the score. When the integral panel members are in a straight plane, the delaminated layers are aligned in a diverging concave-convex manner. The delaminated layers traverse through the plane of the longitudinal axis of the score.

A fuller understanding of the invention may be had by referring to the description and claims taken in conjunction with the accompanying drawings in which:

FIGURE 5 is a plan view of a container blank having folds therein effectuated by the method of the invention.

FIGURE 6 is a view of a container formed from the container blank shown in FIGURE 5.

FIGURE 9 is a plan view of a container blank for a hexagonal container.

FIGURE 10 is a view of a container formed from the container blank of FIGURE 9.

The term "hingeable fold," as used herein, refers to a fold characterized by properties analogous to the fold in a paperboard carton. Among the several properties of such fold is its resistance to cracking or fracturing upon flexing. Another characteristic feature of such a fold is the ability to retain its resiliency and maintain an angular junction when the two adjacent appendant planes traverse about the longitudinal axis of said fold. An additional characteristic of said fold is its ability to resist tearing or shearing along the fold. In addition a hingeable fold has impact resistance.

Figure 1:
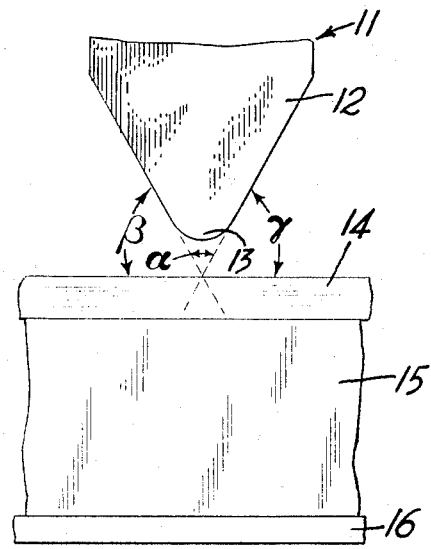
FIGURE 1 is an enlarged fragmentary elevational view showing suitable apparatus for practicing the method of the invention in position to effectuate a hingeable fold in a plastic sheet.

Referring to FIG. 1 of the drawing, the method of the invention may be accomplished by bringing a bevel scoring member 11 (to be described hereinafter in detail) into contact with a plastic sheet 14 which is supported by a resilient backing member 15 which in turn is supported by a rigid member 16 shown as being of metal. It is necessary that the bevel scoring member 11 have a bevel section 12 which has a projected apex angle, $\alpha$, from 45 degrees to 80 degrees inclusive and a rounded impact edge 13 tangentially and sectionally disposed in respect to the surfaces defining the bevel section 12, the rounded impact edge 13 being defined by an average radius from 25 percent to 110 percent of the thickness of the sheet 14 being scored. In addition the surfaces defining the bevel section 12 are so oriented to form respective angles, $\beta$ and $\gamma$, which are hereinafter referred to as "non-adjacent angles," each of from 45 degrees to 70 degrees with respect to a plane in which the resiliently supported sheet 14 reposes. Preferably the scoring member 11 is heated.

Figure 2:
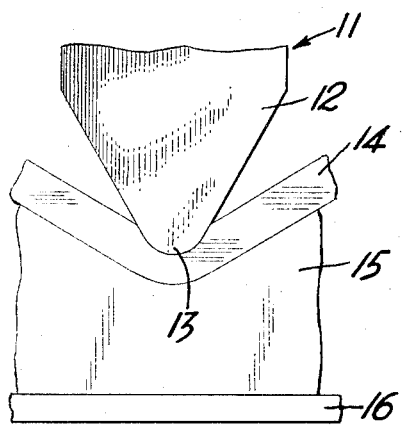
FIGURE 2 is a view of the apparatus shown in FIGURE 1 engaged in effectuating a hingeable fold in a plastic sheet.

As illustrated in FIGURE 2, the plastic sheet 14 is pressed against the resilient backing member 15 by the scoring member 11. The resiliency of the backing member 15 permits the plastic sheet 14 to wrap itself about the impact edge 13 and tends to force it against said impact edge 13. During this part of the process a pressure buildup in the plastic sheet 14 develops along the line of contact with the scoring member 11. Eventually the pressure tension and temperature are sufficient to cause the oriented plastic sheet 14 to splay outwardly from the line of contact. Due to a non-uniform heat distribution from the scoring member 11 the portion of the plastic sheet 14 in the proximity of the impact edge 13 is under less tension than portions more removed therefrom, and a laminar structure is formed about the line of contact. Due to the cooperative action of the scoring member 11 and the resilient backing member 15, the plastic sheet 14 is subjected to a tension which is perpendicular to the line of contact and along the contour of the plastic sheet. Upon disengagement of the cooperative elements, the plastic sheet 14 contracts about the score. This contraction causes the delaminated layer about the score to form more distinct delaminations. These delaminated layers traverse the longitudinal axis of the score and are integrally connected to the adjacent and unscored portion of the oriented plastic sheet.

Plastic sheets which are employable for preparing plastic container blanks herein include those oriented plastic sheets fabricated from styrene polymers having the properties of semi-rigidity, high flexural strength and a tendency to randomly craze or delaminate upon folding. In general, single ply plastic sheets ranging in thickness from about 2 mils to about 30 mils are employable, however, thicker plastic sheets may be used if desired. Advantageously employed are those biaxially oriented plastic sheets of styrene polymers ranging in thickness from about 5 mils to about 15 mils with those plastic sheets ranging from about 5 mils to about 10 mils being most preferred. Exemplary plastics include biaxially oriented polystyrene and other biaxially oriented styrene polymers such as acrylonitrile-styrene copolymers, methylacrylate-styrene copolymers, ethylene-styrene copolymers, 2-methylstyrene polymers, pentachlorostyrene copolymers and other biaxially oriented polymers having properties similar thereto. Preferably employable are biaxially oriented styrene polymers containing in total the styrene moiety with substituents thereon such as polymerized p-benzyl-styrene, 2-bromo-7-trifluoromethyl-styrene, 3,5-dimethyl-styrene, p-vinylbiphenyl and the like. More preferably employed is biaxially oriented polystyrene, said polystyrene being biaxially stretched at stretch ratios ranging from about 2:1 to about 5:1 machine direction and from about 2:1 to about 5:1 transverse direction, with a transverse direction stretch ranging from about 5:2 to about 3:1 and machine direction stretch ratio ranging from about 5:2 to about 3:1 being most preferred.

A resilient backing member is critical in the present method to secure satisfactory hingeable folds. Advantageously employable as resilient backing members are materials of slow acting resilience. Typical resilient members include those having a depression ranging from about 5 to about 95 percent when subjected to a force of 100 pounds per square inch for one minute. Advantageously employed in the present method are resilient members with a depression range from about 15 percent to about 90 percent when subjected to a force of 100 p.s.i. for one minute. Preferably included are those resilient members with a depression range from about 40 percent to about 75 percent when subjected to a force of 100 p.s.i. for one minute and those having a depression ranging from about 50 percent to about 70 percent under aforesaid conditions are most preferred. Illustrative backing members are cork, soft rubber, balsa wood, paperboard and other materials of similar resilience. Exemplary of a preferred backing member is a fine grain cork exhibiting non-directional characteristics.

In order to effect a plurality of scores in a plastic sheet, it is desirable to employ a resilient member having a thickness from 100 mils to about 15 mils. When placing a score line near the edge of a plastic container blank (e.g. about $\frac{1}{4}''$) further advantage may be obtained by employing a resilient backing member ranging in thickness from about 25 mils to about 50 mils. The preferred resilient backing member thickness ranges from about 30 mils to about 45 mils with a thickness ranging from about 40 mils to about 45 mils being most preferred.

In carrying out the method of the present invention it is necessary that the bevel scoring member have a bevel section which includes a projected apex angle, i.e., an included bevel angle as formed by the loci of the surfaces defining the bevel section, from 45 degrees to 80 degrees inclusive and a rounded impact edge tangentially and sectionally disposed in respect of surfaces defining the bevel section, the rounded impact edge being defined by an average radius ranging from 25 percent to 110 percent of the thickness of the plastic sheet being scored, the surfaces defining the bevel section being oriented to form respective non-adjacent angles each from 45 degrees to 70 degrees inclusive with respect to the plane in which the resiliently supported sheet reposes. These non-adjacent angles, respectively designated in FIG. 1 as $\beta$ and $\gamma$, are adjacent to the projected apex angle and located between the bevel section surfaces and the plane in which the plastic sheet reposes. Advantageously employed as a scoring member are those members having a projected apex angle from about 50 to about 70 degrees, a rounded impact edge having an average radius ranging from about 25 percent to about 50 percent of the thickness of the plastic sheet being scored and being oriented so as to form respective non-adjacent angles each from 55 degrees to about 65 degrees inclusive. Preferably employable as a scoring member is a scoring member having a center bevel section, said bevel section having a projected apex angle of about 60 degrees and a rounded convex impact edge tangentially and sectionally disposed in respect to the surfaces defining the bevel section, said impact edge having an average radius of about 40 percent of the thickness of the plastic sheet being scored.

A scoring member having the aforementioned characteristics and employable in scoring, for example, a 7½ mil plastic sheet, can readily be prepared by grinding and polishing the impact edge of a standard center bevel cutting rule. It is important that the impact edge be substantially free from surface imperfections such as abrupt surface inclinations or depressions, burrs, and sharp ridges and like imperfections which have a tendency to impart local imperfections (e.g., a scratched surface or fractured surface) along the score and thus induce fracturing or cracking when said score is folded. Especially undesirable are those surface imperfections running along the longitudinal axis of the impact edge. A satisfactorily employable impact edge would appear to be devoid of abrupt surface inclinations of depressions, burrs, or sharp ridges when viewed under a 60 power microscope. A fine crocus cloth may satisfactorily be employed in polishing the impact edge.

The bevel scoring member can readily be employed in the making of precut and prescored plastic sheet blanks which subsequently can be folded into a carton. Although the scoring may be accomplished by hand it is desirable to employ an apparatus similar to that used in the making of precreased and precut paper cartons. In the making of paper carton blanks, the scoring members, i.e. creasing rules, are recessed in relation to the cutting rules and are supported in a wood die; such a die may be used in the practice of this invention. Since controlled elevated temperatures are necessary to effectuate a hingeable fold, it is necessary that the scoring member or rule be capable of heating the impact edge. Generally sufficient for this purpose are heat conductors such as a metal scoring member. For practical operation it has been found that a steel scoring member will suffice. The temperature can be controlled by a thermostatically controlled heating element. A typical heating element consists of a 5/8" thick parallel faced heating plate normally used for the heating of embossing dies. The above-mentioned apparatus may be adapted to a reciprocating platen press or to a rotary type press as well as other means commonly known to the art.

In the present process the scoring member is maintained at an effective temperature sufficient to cause local deformation and local delamination of the plastic sheet along the line of contact. Illustrative scoring member temperatures, i.e. the impact edge temperature, are those temperatures in excess of the heat distortion temperature of the plastic sheet being scored but no more than 100° F. above said heat distortion temperature. Preferably the scoring member is maintained at a temperature ranging from about 30° F. to about 60° F. above the heat distortion temperature of the plastic sheet being scored. Most preferably the scoring member is maintained at a temperature from about 35° F. to about 50° F. above the heat distortion temperature of the plastic sheet being scored.

The time interval that the scoring member is in contact with plastic sheet is interdependent on the temperature of the scoring member being employed. A direct proportional relationship exists between the time interval that the scoring member is in contact with the plastic sheet and the temperature of the scoring member. Illustrative of the proper time interval at a given scoring member temperature is the scoring of bioriented polystyrene sheets with a scoring member maintained at 225° F. Employing contact time intervals of 0.08, 0.12 and 0.24 second in cutting and scoring of bioriented polystyrene sheets having thickness of 7½ mils into container blanks wherein the scoring member was maintained at 225° F. it was found that those having a contact time interval of 0.08 second did not have scores which were locally deformed or locally delaminated; whereas those blanks having scores resulting from a contact time interval of 0.24 second were locally deformed but absent a plurality of delaminated layers; however, those scores formed by a contact time interval of 0.12 second were locally deformed and locally delaminated, e.g. a plurality of delaminated layers usually in excess of four delaminated layers was produced.

In a similar manner the thickness of the plastic sheet should bear a relationship to the temperature and time interval so that an appropriate quantum of heat is transferred to the plastic sheet. The thicker plastic sheets require a greater quantum of heat.

In general the pressure applied and the temperature of the scoring member are sufficient to cause a displacement of at least 10 percent by volume of the plastic sheet along the line of the score. Advantageously the pressure and temperature are sufficient to cause a displacement from about 15 percent to about 40 percent by volume of plastic sheet along the line of score with a volume displacement ranging from about 20 percent to about 30 percent by volume being preferred. Effective pressures ranging from about 75 pounds per linear inch to about 500 pounds per linear inch may be employed in the instant process. In effectuating a local deformation and local delamination in the plastic sheet about and along the line of contact with the scoring member, the pressure is advantageously maintained from about 150 pounds per linear inch to about 300 pounds per linear inch.

The locally deformed and delaminated score will tend to have less resistance to folding than a plastic blank devoid of said score. In general it has been found that a locally deformed and delaminated scored blank requires about 50 percent to about 75 percent of the force that is required to fold an unscored plastic blank. In the preferred form, the score requires from about 60 percent to about 70 percent of the force required to fold an unscored blank; consequently when one of the integral panel members is held stationary and a force is applied perpendicular to the plane of the other integral panel member, said panel pivots about the axis formed by the score.

Before ultimate assembly of the scored plastic container blank, it is advantageous to prebreak the score. Prebreaking of the score aids in creating a more hingeable fold. Prebreaking the score comprises pivoting at least one of the integral panel members in the direction of concavity of the score, i.e., toward the side of the polymer sheet that the scoring member was in contact with during the scoring process, and pivoting at least one of the integral panel members in the direction of convexity of the score, i.e., the side opposite the concavity. Accordingly pivoting at least one integral panel member in the direction of the concavity of the score so that the included angle between the two integral panel members is reduced by about 120 degrees from a plane formed by two adjacent panel members, i.e., two members at 180 degrees, and a reverse direction upon at least one of the integral panel members in the direction of the convexity of the score such that the panel member traverses at least about 5 degrees from a plane formed by two adjacent panel members is sufficient to prebreak a score. Better results will be obtained during the prebreaking of a score if at least one of the panel members traverses in the direction of the concavity at least 150 degrees and preferably more than 175 degrees from a plane formed by two adjacent panel members; correspondingly at least one of the panel members should be pivoted in the direction of the convexity from a plane formed by two adjacent panel members by more than 10 degrees and preferably more than 20 degrees. The plastic container panel members may then be returned to a flat form for shipping convenience.

Figure 3:
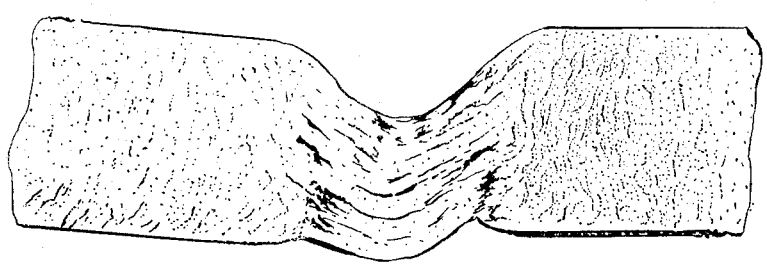
FIGURE 3 is a representation of the appearance of the fold area of a 7½ mil bioriented polystyrene sheet blank treated in the manner of the invention showing the locally deformed and locally delaminated score and adjacent portions of the two integral panel members.
Figure 4:
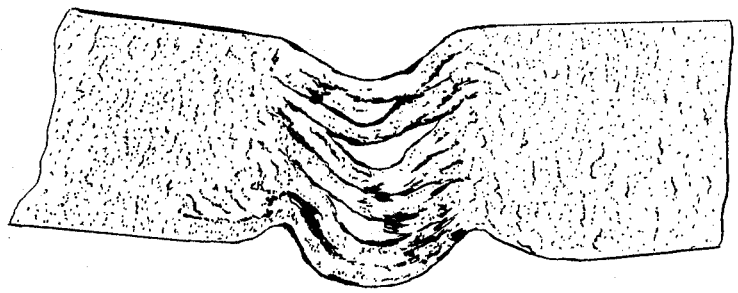
FIGURE 4 is similar to FIGURE 3, but shows a bioriented polystyrene container blank with a prebroken score along with the adjacent portions of the two integral panel members.

A comparison of the prebroken scores provided herein, as illustrated in FIGURE 4, with scores herein disclosed which have not been prebroken, as illustrated in FIGURE 3, shows that a prebroken score is more delaminated than those which are not.

FIGURE 3 shows that when the two integral panel members of a prebroken score lie in such a manner so as to form a straight plane, the concave portion of the score tends to be less concave than a score that has not been prebroken. In contrast the convex portions of score becomes more convex. The delaminated layers reveal very little cracking or fracturing and are integrally connected to the two adjacent panel members. Delaminated layers in the proximity of the concave portion of score tend to lie in a substantially flat plane whereas the delaminated layers further removed from the concave portions of the score tend to become more semi-circular.

A prescored plastic container blank with a locally deformed and locally delaminated score has properties heretofore unknown. Illustrative of the locally deformed and locally delaminated score are the following tests conducted on rectangular, 7½ mil bioriented polystyrene sheets having a width of two inches and a length of 4 inches.

(a) The ability of a locally deformed and locally delaminated score to integrally connect the adjacent appendant panel members after the applications of more than 200 flexings followed by testing under tension conducted under the following conditions:
  (1) the locally deformed and locally delaminated score was effected in the plastic sheet such that it perpendicularly bisected the rectangular sheet into two squares;
  (2) one of the integral panel members was pivoted in the direction of the concavity of the score to 180 degrees less 32 mils and then said member was returned so it formed a straight plane with the other panel member;
  (3) tension totalling one pound was applied along the plane of the two panel members;
  (4) then one of the integral panel members was pivoted in the direction of the convexity of the score to 180 degrees less 32 mils and then said member was pivoted such that it formed a straight plane with the other panel member;
  (5) procedure set forth in aforesaid (3) was followed and
  (6) procedure set forth in (1)–(5) above was repeated.
(b) The panel members remained integrally connected to each other by means of the score even after 40 applications of tension conducted under the following test procedure:
  (1) one integrally connected panel member was pivoted in the direction of the concavity of the score so that it was flat against the other panel member;
  (2) a flat, solid, rectangular shaped steel weight with smooth flat surfaces measuring two inches in length and ¾" in width was placed on the score and adjacent panel members such that it exerted a two pound force against the score and adjacent panel members, said score and said panel members resting against a rigid, steel surface;
  (3) one of the panel members was then pivoted so that it was in a straight plane with the other panel member and then a tension totalling four pounds was applied;
  (4) then one of the integrally connected panel members was pivoted in the direction of the convexity of the score to the extent that it was flat against the other panel member,
  (5) the procedure in b (2) was employed;
  (6) the procedure in b, (3) procedure was employed and
  (7) the procedure set forth in b (1) through b (6) was repeated.
(c) Tests for determining the ease with which the score could be folded was conducted. This was accomplished by employing a test apparatus consisting of two solid, ⅝ inch diameter, free rolling, steel rollers which radii were fixed at 1⅛ inches apart, and a separate 1/16 flat rule which perpendicularly bisected the center of the circumference of the aforesaid rollers and calibrated so as to indicate the ounces necessary to force a rectangular 7½ mil plastic sheet 2 inches square between said rollers.

Illustrative are the following results:
  (1) an unscored bioriented polystyrene sheet required a force of 14 ounces upon the 1/16" flat rule to completely force the said sheet between the two rollers;
  (2) a bioriented polystyrene sheet having a locally deformed and locally delaminated score, which perpendicularly bisected the rectangle, length required a force of 9 ounces upon the score by the 1/16" flat rule to completely force the said sheet between the two rollers and
  (3) employing the sheet similar to that used in c (2) with the exception that the score was prebroken by pivoting one of the integral panel members 180° less 32 mils in the direction of the concavity of the score and then returning said member to a straight plane, it was found that a force of six ounces upon the said score by the 1/16" rule was required in order to force the said sheet between the two rollers.

In further reference to the attached drawings, FIGURE 5 illustrates a container blank, profiled to provide four integrally connected side panel members enumerated as 21, 22, 23, and 24 which are defined by the parallel score lines 25, 26, 27 and 28 and integrally connected top panel member 30 which is defined by the parallel crosswise score lines 31 and 32 and which is integrally connected to top panel member tuck 36 wherein said top tuck 36 is defined by crosswise score line 32, an integrally connected bottom panel member 33 which is defined by the parallel crosswise score lines 34 and 35 and which is integrally connected to bottom panel member tuck 37 wherein said bottom tuck is defined by crosswise score line 34, an integrally connected top outer side panel member tuck enumerated as 38 and bottom outer side panel member tuck 39 which are respectively defined by the parallel crosswise score lines 40 and 41 and an integrally connected top inner side panel member tuck 42 and an integrally connected bottom inner side panel member tuck 43 wherein said inner taps are respectively defined by the parallel crosswise score lines 44 and 45. All score lines in this container blank are on the same side of the plastic sheet.

Figure 7:
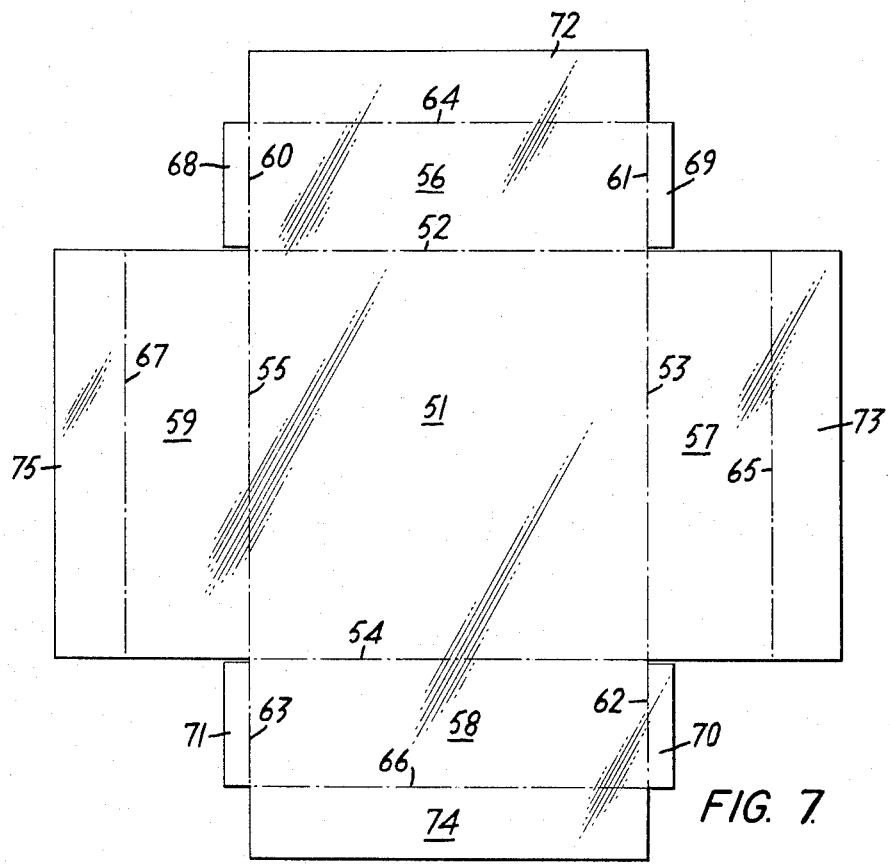
FIGURE 7 is a plan view of a container blank having folds therein practiced by the method of the invention, the blank being capable of being inserted in cardboard backing member.

The bubble container blank in FIGURE 7 is suitably profiled to provide a top face panel member 51 which is defined by the crosswise parallel score lines 52 and 54 and vertical parallel score lines 53 and 55, an integrally connected top side panel member 56 which is integrally connected to a top side panel member tuck 72 and an integrally connected left top side panel member tuck 68 and an integrally connected right top side panel member tuck 69, the top side panel member tucks being defined respectively by the score lines 64, 60 and 61, an integrally connected left side panel member 59 which is integrally connected to a left side panel member tuck 75 that is defined by a vertical score line 67, an integrally connected right side panel member tuck 57 that is integrally connected to a right side panel member tuck 73 that is defined by a vertical score line 65 and an integrally connected bottom side panel member 58 which is integrally connected to a bottom side panel member tuck 74 and an integrally connected left bottom side panel member tuck 71 and an integrally connected right bottom side panel member tuck 70, the respective bottom side panel member tucks being respectively defined by score lines 66, 63 and 62. Scores 64, 65, 66 and 67 being scored on the opposite side of the plastic sheet from scores 52, 53, 54, 55, 60, 61, 62 and 63.

Figure 8:
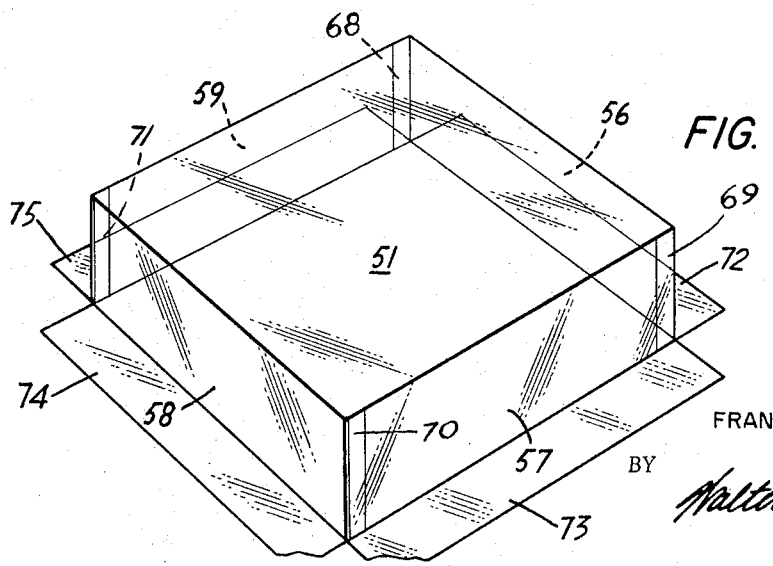
FIGURE 8 is a view of the container blank of FIGURE 7 in folded form showing outwardly folded panel members.

FIGURE 8 represents the assembled bubble container blank of FIGURE 7, showing the outwardly folded side panel member tucks 72, 73, 74 and 75 and the inwardly folded side panel members 56, 57, 58 and 59. As illustrated in FIGURE 8, the left top side panel member tuck 68, the right top side panel member tuck 69, the bottom left side panel member tuck 71 and the bottom right side panel member tuck 70 are all folded inwardly and respectively bonded to the side panel members 59, 57, 59 and 57.

The hexagonal container blank represented in FIGURE 9 consists of integrally connected side panel members 85, 86, 87, 88, 89 and 90 which are respectively defined by the parallel crosswise score lines 91, 92, 93, 94, 95 and 96, an integrally connected hexagonal top panel member 97, an integrally connected hexagonal bottom panel member 98 which is defined by the score lines 99, 100, 101, 102, 103 and 104 which is integrally connected to the bottom inner panel member tucks enumerated at 105, 106, 107, 108 and 109 which are respectively defined by score lines 100, 101, 102, 103, and 104 and an integrally connected inner side panel member tuck 110 which is defined by parallel score line 96. All score lines are on the same side of the container blank.

FIGURE 10 represents the container blank of FIGURE 9 in the assembled form. In FIGURE 10 the bottom panel member 97 and the top panel member 98 have been folded inwardly; the bottom inner panel member tucks 105, 106, 107, 108 and 109 have been also been folded inwardly and lap bonded respectively to side panel members 85, 90, 89, 88 and 87. The inner side panel member tuck 110 has been folded inwardly and lap bonded to the side panel member 85. The hexagonal top 97 has been butt bonded to the side panel members 85, 87, 88, and 89.

What is claimed is:

1. The method for preparing a plastic container blank having a hingeable fold, which comprises resiliently supporting a bioriented styrene polymer sheet and contacting said sheet with a bevel scoring member under a pressure and temperature sufficient to locally deform and delaminate the polymer sheet along the line of contact with said scoring member, said bevel scoring member having a bevel section which includes a projected apex angle from 45 degrees to 80 degrees inclusive and a rounded impact edge tangentially and sectionally disposed in respect to the surfaces defining said bevel section, said rounded impact edge being defined by an average radius from 25 percent to 110 percent of the thickness of the sheet being scored, the surfaces defining the bevel section being oriented to form respective non-adjacent angles each of from 45 degrees to 70 degrees inclusive with respect to the plane in which said sheet is resiliently supported.

2. The method according to claim 1 wherein the bevel section has a projected apex angle from about 50 to about 70 degrees and so oriented as to form non-adjacent angles from 55 degrees to 65 degrees inclusive and the impact edge has an average radius ranging from about 25 percent to about 50 percent the thickness of the sheet being scored.

3. The method according to claim 2 wherein the bevel section is so oriented as to form equal non-adjacent angles.

4. The method according to claim 1 wherein the bevel section has a projected apex angle of about 60 degrees and so oriented as to form respective non-adjacent angles of about 60 degress and the impact edge has an average radius of about 40 percent the thickness of the sheet being scored.

5. The method according to claim 1 wherein the scoring member is maintained at a temperature of at least the heat distortion temperature of the bioriented styrene polymer sheet.

6. The method for preparing a plastic container blank having a hingeable fold, which comprises resiliently supporting a bioriented styrene polymer sheet having a biorientation characterized by a stretch ratio from about 5:1 to about 2:1 in the transverse direction and from about 5:1 to about 2:1 in the machine direction and contacting said sheet with a bevel scoring member maintained under a pressure and temperature sufficient to locally deform and locally delaminate the polymer sheet along the line of contact with said bevel scoring member, said bevel scoring member having a bevel section which includes a projected apex angle from 50 degrees to 70 degrees inclusive and a rounded impact edge tangentially and sectionally disposed in respect of surfaces defining said bevel section, the rounded impact edge being defined by an average radius from about 25 percent to 110 percent of the thickness of the sheet being scored, the surfaces defining the bevel section being oriented to form respective non-adjacent angles each from 55 degrees to 65 degrees with respect to a plane in which the resiliently supported sheet reposes.

7. The method according to the claim 6 wherein the polymer sheet is bioriented polystyrene, the scoring member is maintained at a temperature ranging from at least the heat distortion temperature to about 100° F. above the heat distortion temperature of the bioriented polystyrene sheet.

8. The method according to claim 7 wherein the polymer sheet has a biorientation characterized by a stretch ratio from about 5:2 to about 3:1 in the traverse direction and from about 5:2 to about 3:1 in the machine direction, the scoring member is maintained at a temperature from about 30° F. to about 60° F. above the heat distortion temperature, the impact edge has an average radius ranging from 25 percent to 110 percent the thickness of the polymer sheet being scored.

9. The method according to claim 8 wherein the scoring member has a center bevel scoring member having an included bevel angle of about 60 degrees and a rounded impact edge with an average radius of about 40 percent of the thickness of the plastic sheet being scored.

10. As an article of manufacture a pre-scored plastic container blank in a single ply oriented styrene polymer sheet having at least two integral panel members with a score between said integral panel members, said score being characterized by localized deformation and localized delamination of the plastic blank along the line of the score such that the score consists of plurality of deformed and delaminated layers of plastic, each deformed and delaminated layer of plastic having a thickness less than that of the plastic sheet.

11. An article of manufacture according to claim 10 wherein the prescored polymer container blank is bioriented polystyrene.

12. An article of manufacture according to claim 11 wherein the prescribed polymer container blank is bioriented polystyrene, said blank having a biorientation characterized by a stretch ratio ranging from about 5:2 to about 3:1 in the traverse direction and from about 5:2 to about 3:1 in the machine direction.

13. An apparatus for preparing a plastic container blank comprising, in combination, means for resiliently supporting a polymer sheet; a bevel scoring member having a bevel section, said bevel section having bevel defining surfaces terminating in a rounded impact edge, said surfaces having a projected apex angle of from 45° to 80° inclusive, said bevel section being positioned to define an angle between one of said surfaces and the polymer sheet of from 45° to 70° inclusive, said impact edge having an average radius from 25 percent to 110 percent the thickness of the sheet being resiliently supported; means for applying pressure to said scoring member so that a polymer sheet positioned between said scoring member said said resilient support means will be compressed and stretched; and means for applying heat in close proximity of said scoring member.

14. The apparatus according to claim 13 wherein the bevel section has a projected apex angle from about 50 to about 70 degrees and is oriented so as to form non-adjacent angles from 55 to 65 degrees inclusive and the impact edge has an average radius ranging from about 25 percent to about 50 percent the thickness of the polymer sheet being scored.

15. The apparatus according to claim 14 wherein the bevel section is so oriented as to form equal non-adjacent angles.

16. The apparatus according to claim 13 wherein the scoring member is a center bevel scoring member having a rounded impact edge with an average radius of about 40 percent the thickness of the polymer sheet being resiliently supported and the means for resiliently supporting a polymer sheet is a resilient backing member.

References Cited by the Examiner

UNITED STATES PATENTS 2,954,725  10/1960  Palmer _____ 18—19 X

ROBERT F. WHITE, *Primary Examiner.*

T. J. CARVIS, *Assistant Examiner.*